United States Patent [19]
Karkos, Jr.

[11] Patent Number: 6,164,575
[45] Date of Patent: Dec. 26, 2000

[54] SELF-SEATING COVER ASSEMBLY FOR A REMOVABLE FOOD RECEPTACLE

[75] Inventor: John F. Karkos, Jr., Lisbon Falls, Me.

[73] Assignee: Island Oasis Frozen Cocktail Company, Inc., Walpole, Mass.

[21] Appl. No.: 09/309,553

[22] Filed: May 11, 1999

[51] Int. Cl.[7] .................................................. A47J 43/046
[52] U.S. Cl. ............................... 241/199.12; 241/282.1; 241/DIG. 17
[58] Field of Search .................... 366/279; 241/DIG. 17, 241/DIG. 30, 282.1, 199.12

[56] References Cited

U.S. PATENT DOCUMENTS 4,786,002  11/1988  Mitsubayashi et al. .......... 241/DIG. 17

*Primary Examiner*—Mark Rosenbaum
*Attorney, Agent, or Firm*—Foley, Hoag & Eliot LLP

[57] ABSTRACT

A self-seating cover assembly for a removable food receptacle for a food processing machine, the cover being movably mounted on a support structure attached to the machine and shaped so that, by the act of positioning the food receptacle into the machine, the cover is caused to seat itself in desired position atop and extending partially into the receptacle. The cover is preferably removably mounted on the support structure through an aperture in the cover, and the structure and the cover are constructed to cooperatively maintain the cover in a desired rotational position. The cover may be mounted on a chute through which food is delivered into the receptacle through the mounting aperture in the cover.

11 Claims, 10 Drawing Sheets

SELF-SEATING COVER ASSEMBLY FOR A REMOVABLE FOOD RECEPTACLE

FIELD OF THE INVENTION

This invention relates to machines for cutting or processing food, and particularly to machines having a removable food receptacle in which food is processed and/or into which processed food is delivered by the machine. A cover assembly incorporated in the machine, in cooperation with the action of moving the receptacle into position in the machine, causes a semi-rigid cover to seat itself on and partly within the top of the receptacle to prevent splashing or other unwanted discharge of food from the receptacle. In turn, as the receptacle is removed from the machine, the cover assembly causes the cover to be unseated from the receptacle.

BACKGROUND OF THE INVENTION

Many food processing machines include a removable receptacle in which food may be processed, and/or into which food that has been processed by the machine may be delivered. A well-known example of the former is a conventional home blender, which includes a blender cup removably mountable on a base, and in which food may be mixed, chopped, or otherwise processed. An example of the latter type of apparatus is an ice shaver/blender machine for making frozen drinks. In such a machine, shaved ice is delivered to a receptacle removably mounted below the shaver mechanism. Further processing of the shaved ice and other drink ingredients is performed within the receptacle. In such machines, it is desirable to prevent unwanted splashing and discharge of food from the top of the receptacle, both during processing of the food while in the receptacle, and during delivery of food to the receptacle from another part of the machine.

One machine that includes a cover assembly for a removable food receptacle is a shaver/blender machine described in Mitsubayashi et al. U.S. Pat. No. 4,786,002, entitled Method Of Making Soft Ice-Drink And Apparatus Of Making The Same. According to that patent, shaved ice is delivered to a container cup through a delivery chute, the ice and other drink ingredients then being mixed to make a soft ice-drink. In the Mitsubayashi et al. machine, a "soft" lid is detachably mounted to the lower end of the shaved ice discharge chute to cover the opening of the container and purportedly to prevent the ice granules and other ingredients from escaping the container as the drink is mixed. In that patent the soft lid appears to be a thin, flat, disc-shaped cover that merely sits on or near the top of the container cup.

A "soft" and thin lid that sits atop the receptacle, like that mentioned in the Mitsubayashi et al. patent, does not adequately prevent unwanted splashing and discharge of the drink ingredients when the blender mechanism in an ice shaver/blender machine is operated.

It is therefore an object of the present invention to provide a cover for a removable food receptacle, which cover will prevent splashing or discharge of the ingredients during processing of the food in the receptacle, and/or while food is delivered to the receptacle.

It is another object of the present invention to provide a cover assembly for a removable food receptacle that is convenient to use, relatively inexpensive to construct, and easy to maintain.

It is a further object of the present invention to provide a receptacle cover that is semi-rigid in order to prevent ready dislodgment, yet easily mountable on the machine and removable from the machine for cleaning or replacement.

It is a still further object of the present invention to provide a self-seating cover assembly that seats the cover in proper position on the receptacle as the receptacle is positioned into the machine.

It is yet another object of the invention to provide a cover assembly that includes a cover having a lower portion that extends partially but substantially into the receptacle to provide better protection against dislodgement, yet does not hamper ready removal of the receptacle from the machine.

SUMMARY OF THE INVENTION

The self-seating cover assembly of the present invention comprises a semi-rigid cover for a removable food receptacle, the cover being movably mounted on a support structure attached to the food processing machine and shaped so that, by the act of positioning the food receptacle into the machine, the cover is caused to seat itself in desired position atop and extending partially into the receptacle. As the receptacle is removed from the machine, the cover assembly causes the cover to be unseated from the receptacle. Preferably, the cover is removably mounted on the support structure through an aperture in the cover, and the structure and the cover are provided with cooperating means to maintain the cover in a desired rotational position. In the preferred embodiment here described, the cover is mounted on a chute through which food is delivered into the receptacle via the mounting aperture in the cover.

DETAILED DESCRIPTION OF THE INVENTION

Figure 1:
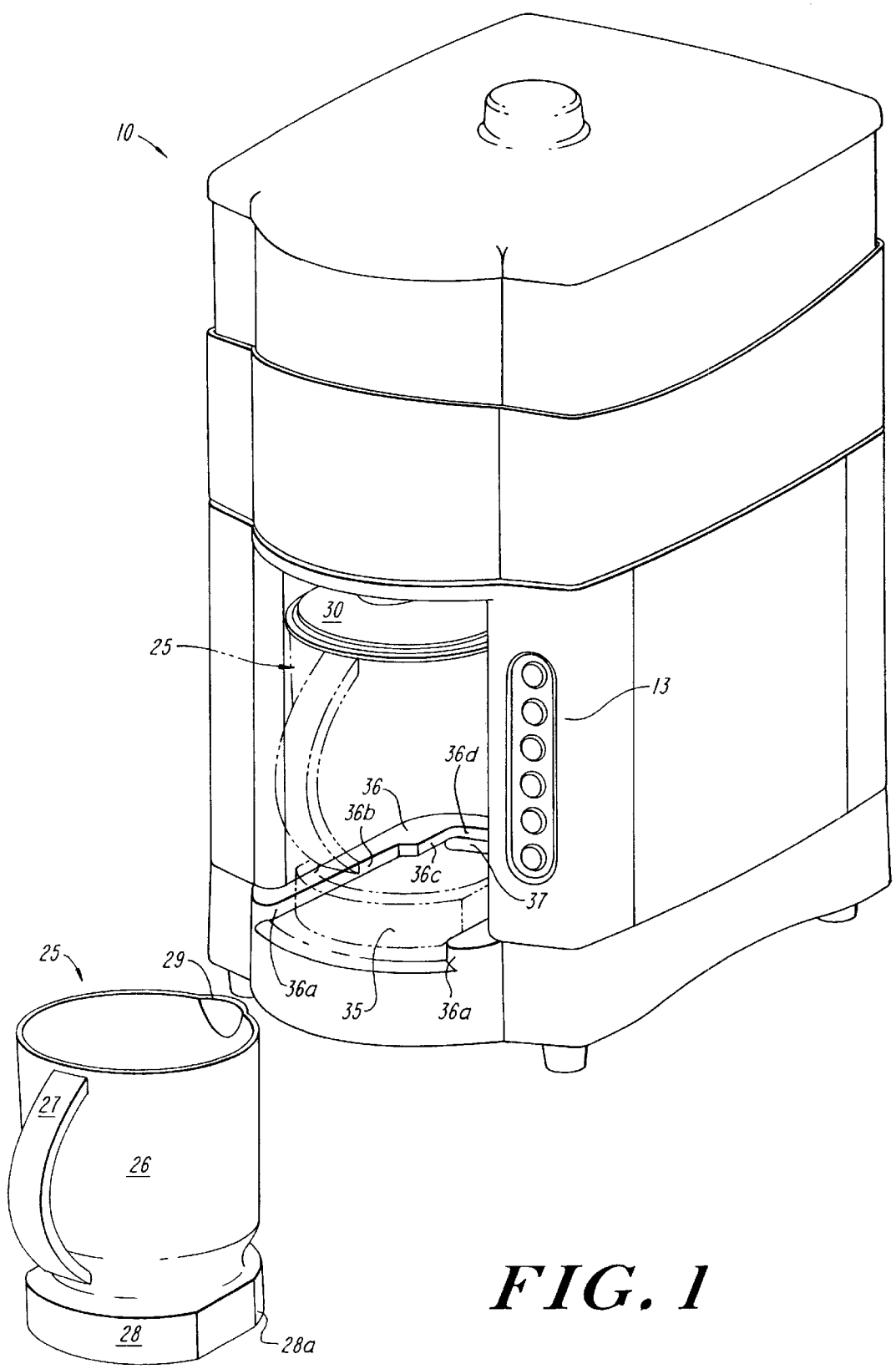
FIG. 1 is a perspective view of an ice shaver/blender apparatus and a blender cup, illustrating in dashed lines the position of the blender cup when mounted in the machine.
Figure 2:
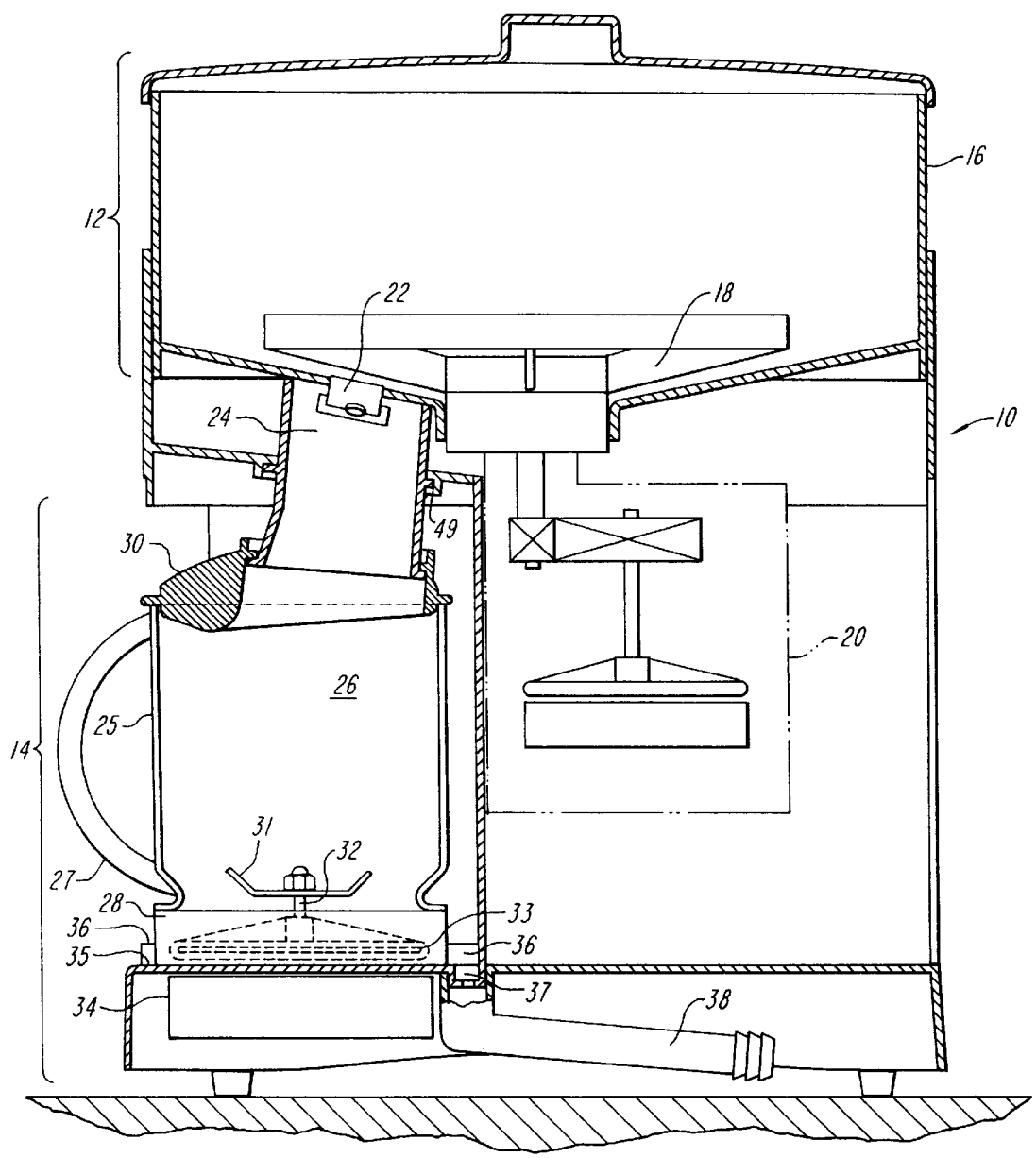
FIG. 2 is a representational sectional view of the shaver/blender machine of FIG. 1, with the blender cup in position under the ice shaver chute, and the cover seated on and extending partly into the blender cup in accordance with the present invention.
Figure 3:
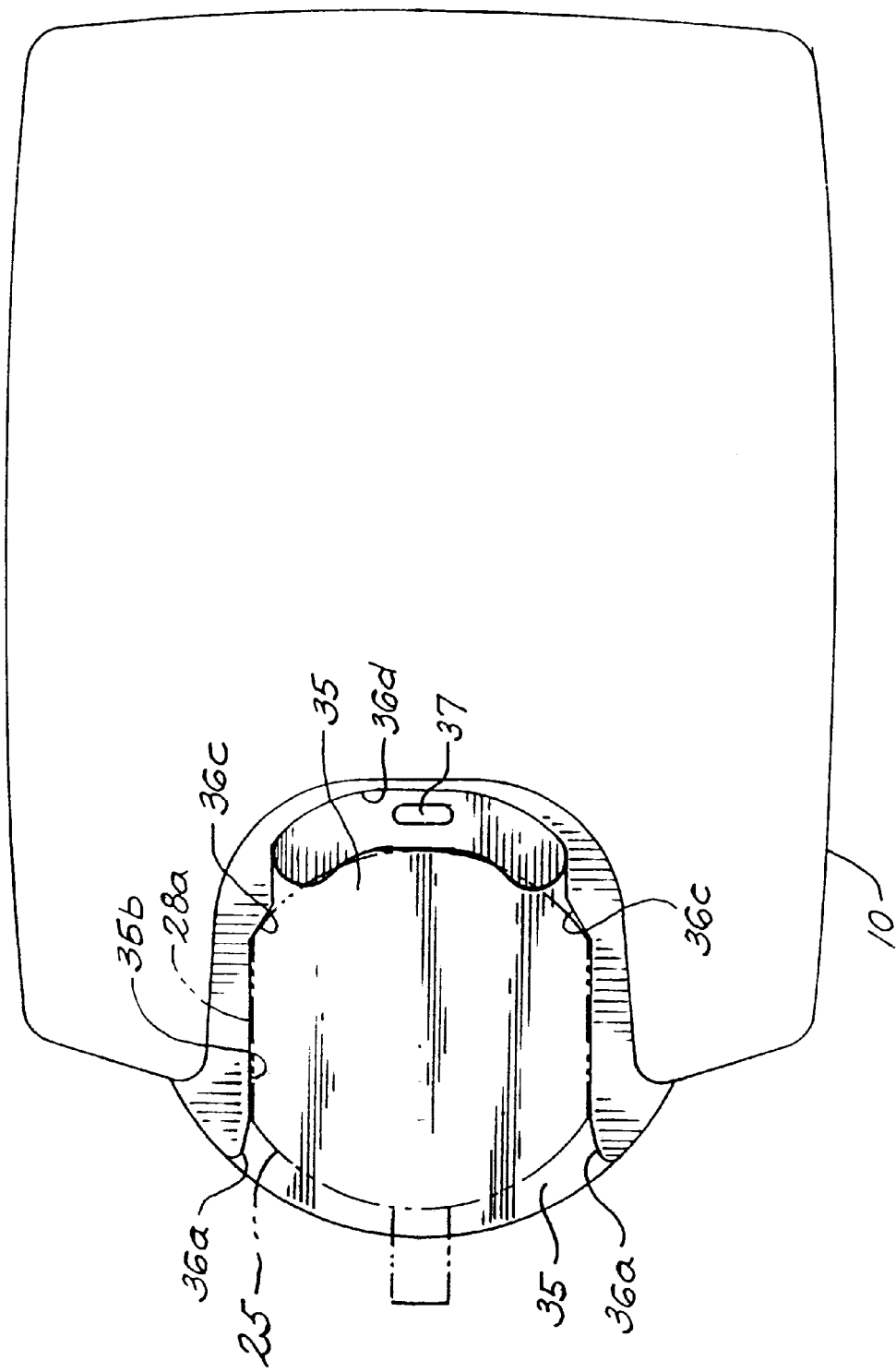
FIG. 3 is a representational top plan view of the final position of the blender cup after it has been fully slid into position in the machine, ready to receive shaved ice from the ice shaver mechanism.

Machine 10 for making frozen drinks, depicted in FIGS. 1 and 2, comprises an ice shaver shown generally at 12, mounted above a blender assembly shown generally at 14. A blender cup 25 may be positioned in machine 10 by sliding the base 28 of the blender cup toward the back of the blender platform 35. As illustrated in FIGS. 1 through 3, a shoulder 36 projecting upwardly around the perimeter of blender platform 35 has rounded outer ends 36a that cooperate with a flat area 28a on each side of blender cup base 28 to guide blender cup 25 into proper position as it is slid into the machine. The shoulder 36 further includes straight sections 36b that cooperate with flat areas 28a on blender cup base 28 to prevent cup 25 from rotating when the blender is operated, and further includes inwardly curved portions 36c on each side near the back of the blender platform 35 to serve as a stop against further inward movement of blender cup 25, thereby ensuring proper final positioning of the cup under ice chute 24. A drain hole 37 at the rear of blender platform 35 permits any spilled liquid to drain off through drain hose 38.

Push-button control panel 13, along with associated electronics (not here described), controls the operation of the machine. Ice cubes or chips contained in hopper 16 are driven by rotating pusher blades 18 powered by motor 20, the ice cubes or chips striking shaving blade 22, all in known fashion. The shaved ice particles travel through attached chute 24 into blender cup 25 though an aperture 40 in the cover 30 (see FIG. 4) seated on blender cup 25. D.c. motor 34 causes magnetizable disk 33, housed in blender cup base 28 and axially attached to shaft 32, to rotate, causing impeller 31 attached to shaft 32 to likewise rotate within container 26 of blender cup 25, to blend the shaved ice particles and other drink ingredients that have been introduced into the blender cup. Upon completion of the desired blending, blender cup 25 may be removed from the machine, and the blended drink served to customers.

Figure 4:
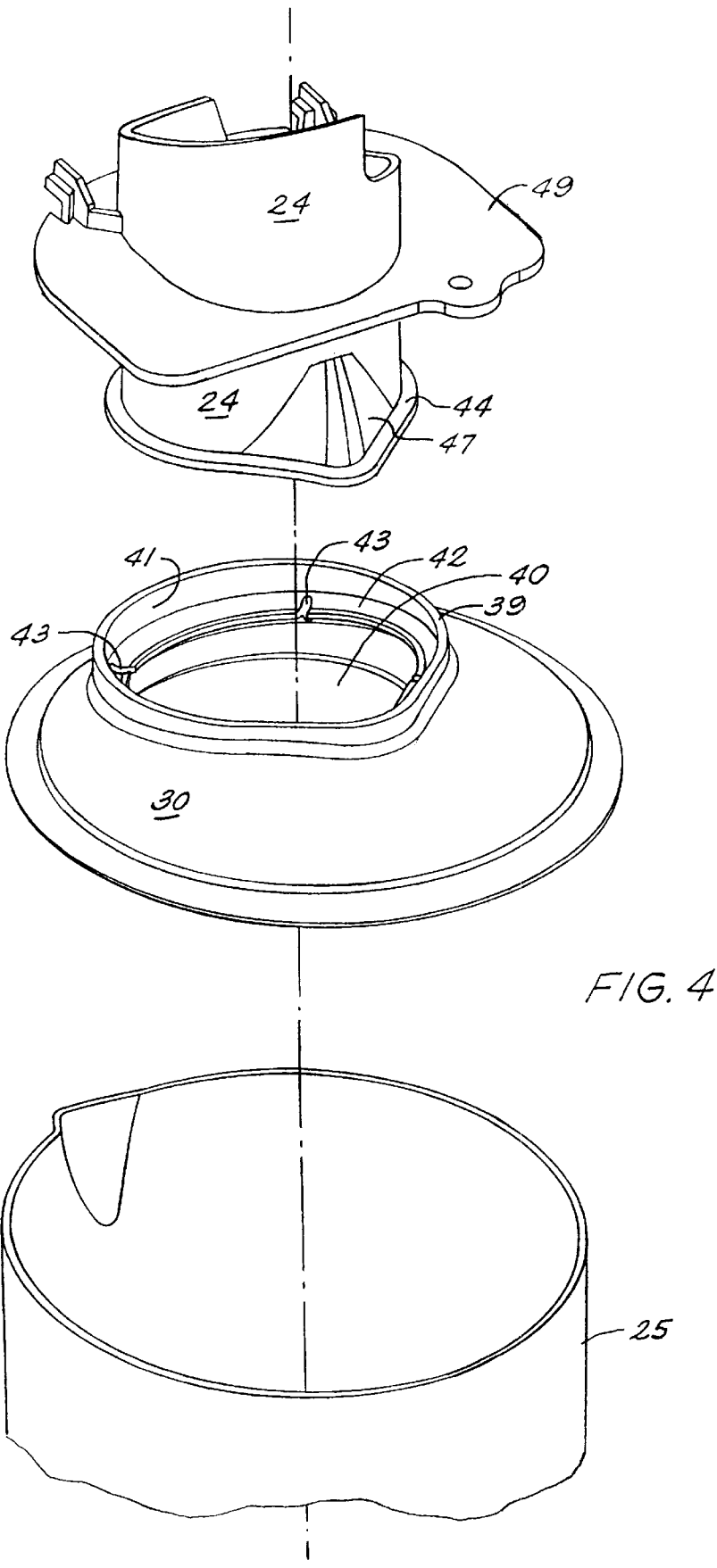
FIG. 4 is an exploded perspective view of the ice shaver chute and the cover positioned above the top of the blender cup.

The instant invention relates to the cover assembly, shown in exploded perspective view in FIG. 4. Chute 24, which serves to guide the shaved ice particles into blender cup 25, is preferably molded from rigid plastic and includes a projecting surface 49 by which chute 24 may be affixed to the machine 10 just below shaving blade 22 (see FIG. 2) by means of conventional fasteners. Cover 30 may be readily mounted onto, and removed from, chute 24 by means of a set of elongated, thin, flexible ribs 42 extending outwardly from the inner wall 41 of cover mounting aperture 40 and separated by gaps 43; ribs 42 may be bent or flexed to permit ready introduction of cover 30 into position on chute 24. A rigid lip 44 extending outwardly from the bottom edge of chute 24 cooperates with flexible ribs 42 on cover 30 to retain the cover on chute 24 until such time as removal is desired. Collar 39, integrally formed as part of cover 30, projects upwardly to provide support for ribs 42 and aperture 40.

Figure 5:
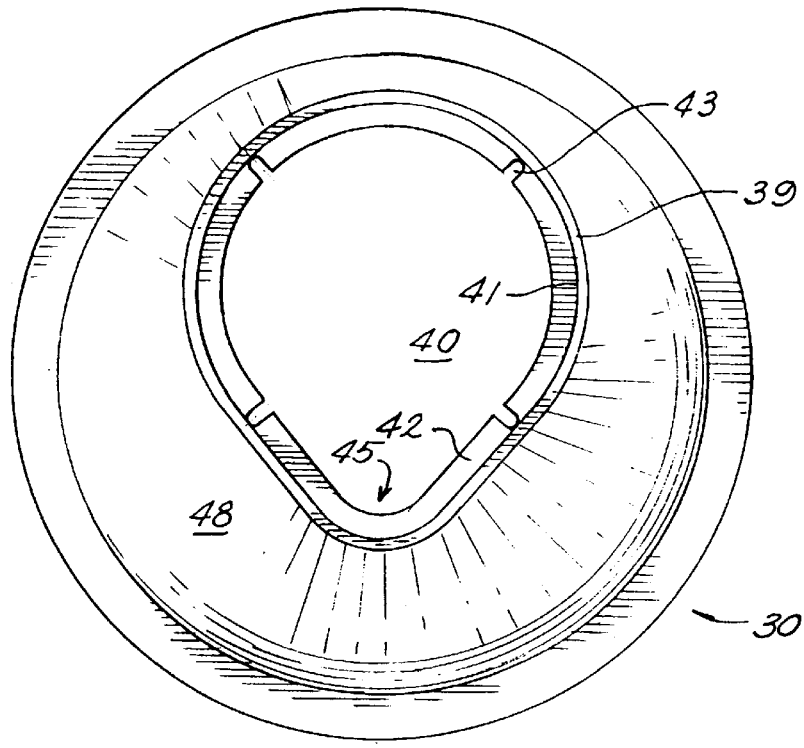
FIG. 5 is a top plan view of the cover of FIG. 4.

As seen in FIG. 5, in the particular embodiment here described, mounting aperture 40 in cover 30 is located off-center. It has been found desirable to have the shaved ice enter the blender cup at a location away from the center of the cup, so that impeller 31 may most efficiently blend the drink ingredients. As seen in FIG. 2, the machine here described is designed and constructed so that, when blender cup 25 is in position, shaved ice chute 24 is not centered on blender cup 25 but rather is positioned slightly to the rear of center. Hence, aperture 40 in cover 30 is likewise off-center. Aperture 40 is generally circular except for an angled corner 45 formed at the front side of the aperture. The front portion of chute 24 has a similarly angled, nose-like projection 47 at its front edge. (See FIG. 4). In cooperation, the angled corner 45 of cover 30 and the nose-like projection 47 of chute 24 ensure that the cover 30 may be mounted in only one orientation on chute 24—i.e., with angled corner 45 and projection 47 facing toward the front of the machine. It is easiest to fit cover 30 onto and remove it from chute 24 by first moving flexible ribs 42 past rigid lip 44 in the area of nose-like projection 47, and then pushing the remaining ribs past the lip. Once mounted, cover 30 may travel upward on chute 24 from its rest position, as the blender cup is slid into, or removed from, its proper position in the machine.

Figure 6:
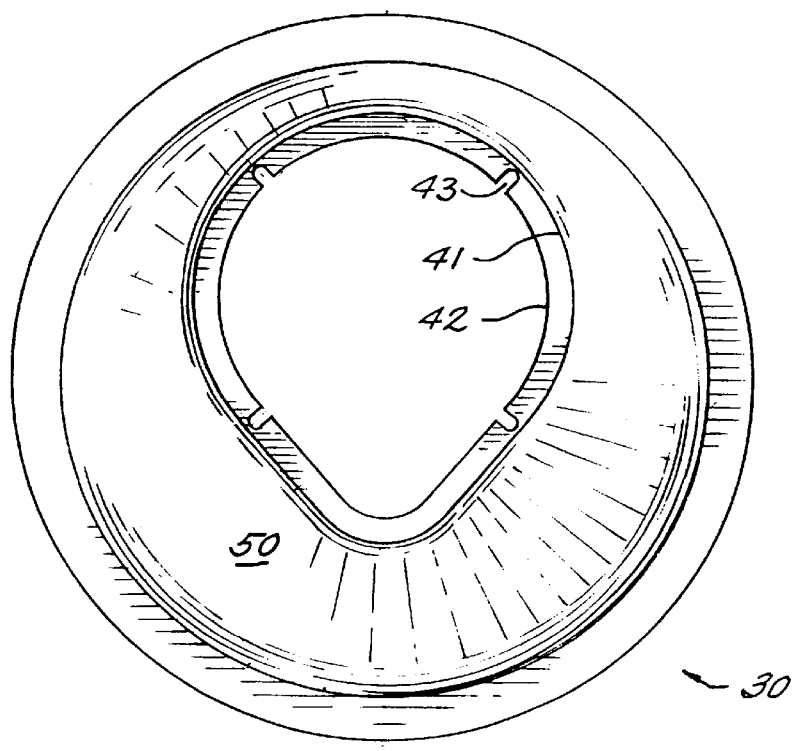
FIG. 6 is a bottom plan view of the cover of FIG. 4.
Figure 7:
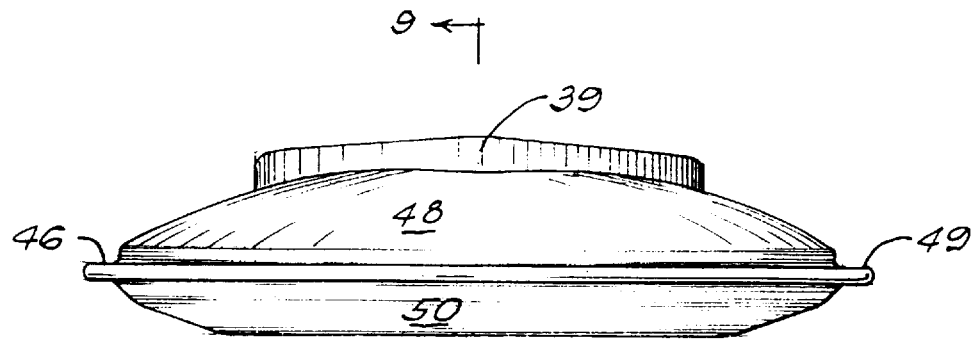
FIG. 7 is a front elevational view of the cover.
Figure 8:
FIG. 8 is a right side elevational view of the cover.

FIG. 6 depicts the lower side of cover 30. As further seen in FIGS. 7 and 8, the lower portion 50 of cover 30 is gently rounded in front to permit the top edge of blender cup 25 to slide easily toward its final position, as cover 30 is pushed up in a camming action, as explained below. Cover 30 is preferably symmetrical about a plane running vertically through the center of angled corner 45 and to the back of the device, the upper portion 48 above circumferential rim 49 being considerably greater in mass than lower portion 50. From the side view of FIG. 8, it may be seen that the cover is designed to be front loaded—i.e., there is much more material in front of the mounting aperture 40 than behind it. The cross-sectional view of FIG. 9 also demonstrates that the cover 30 is relatively heavily weighted toward the front.

Figure 9:
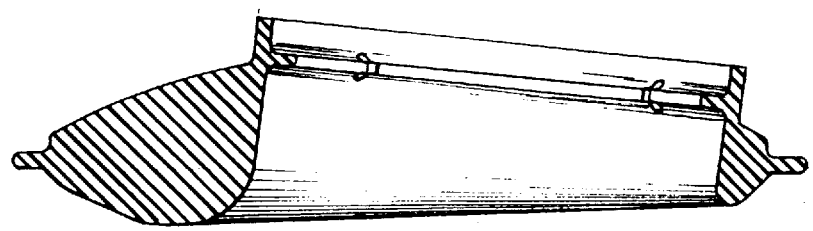
FIG. 9 is a cross-sectional view of the cover taken along line 9—9 of FIG. 7.
Figure 10:
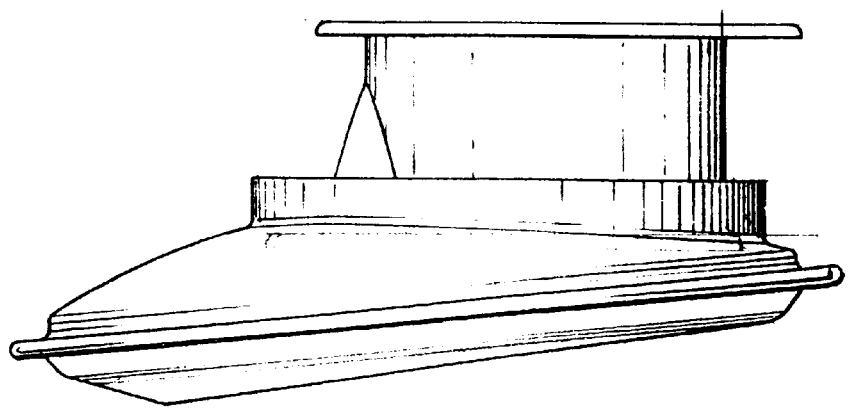
FIG. 10 is a side view of the cover in rest position, mounted on the ice shaver chute, prior to positioning of the blender cup in the machine.
Figure 11:
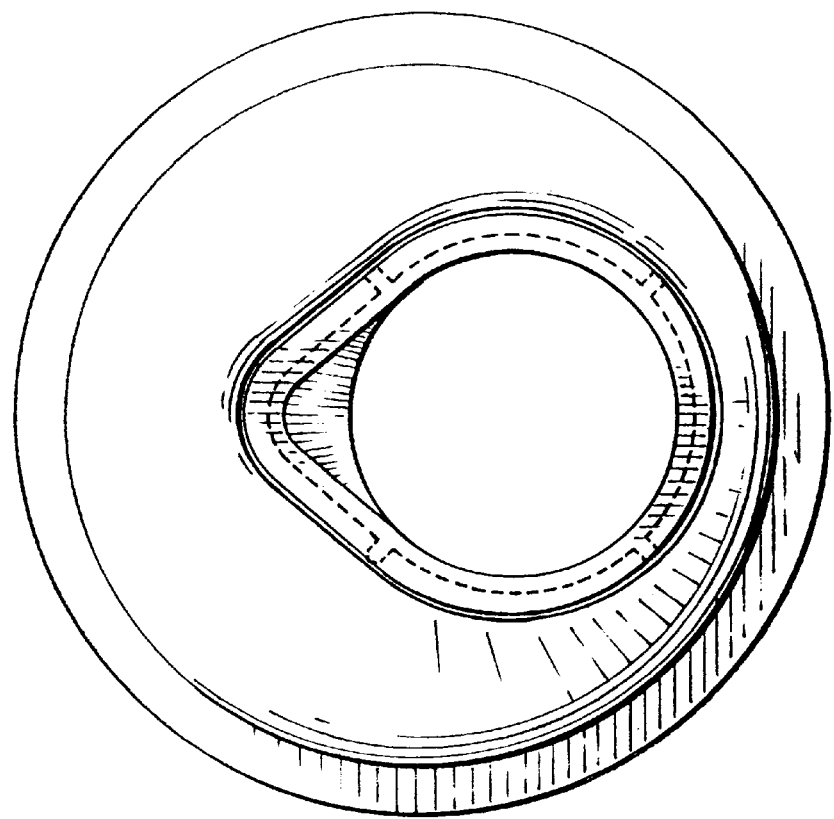
FIG. 11 is a bottom plan view of the cover in rest position on the ice shaver chute.

FIG. 9 illustrates that flexible ribs 42 lie in a plane that is not parallel with the plane of circumferential rim 49. As a result, when the cover 30 is mounted on chute 24 in its "rest" position—i.e., without the blender cup positioned in the machine—the front-loaded weight of cover 30 will ensure that flexible ribs 42 come to rest on lip 44 at the bottom edge of ice chute 24, and that circumferential rim 49 will lie in a plane angling downward from back to front. The rest position of cover 30 is further illustrated in FIG. 10. FIG. 11 provides a bottom view of the cover 30 mounted in rest position on ice chute 24, lip 44 (FIG. 4) retaining the cover on the machine.

Figure 12:
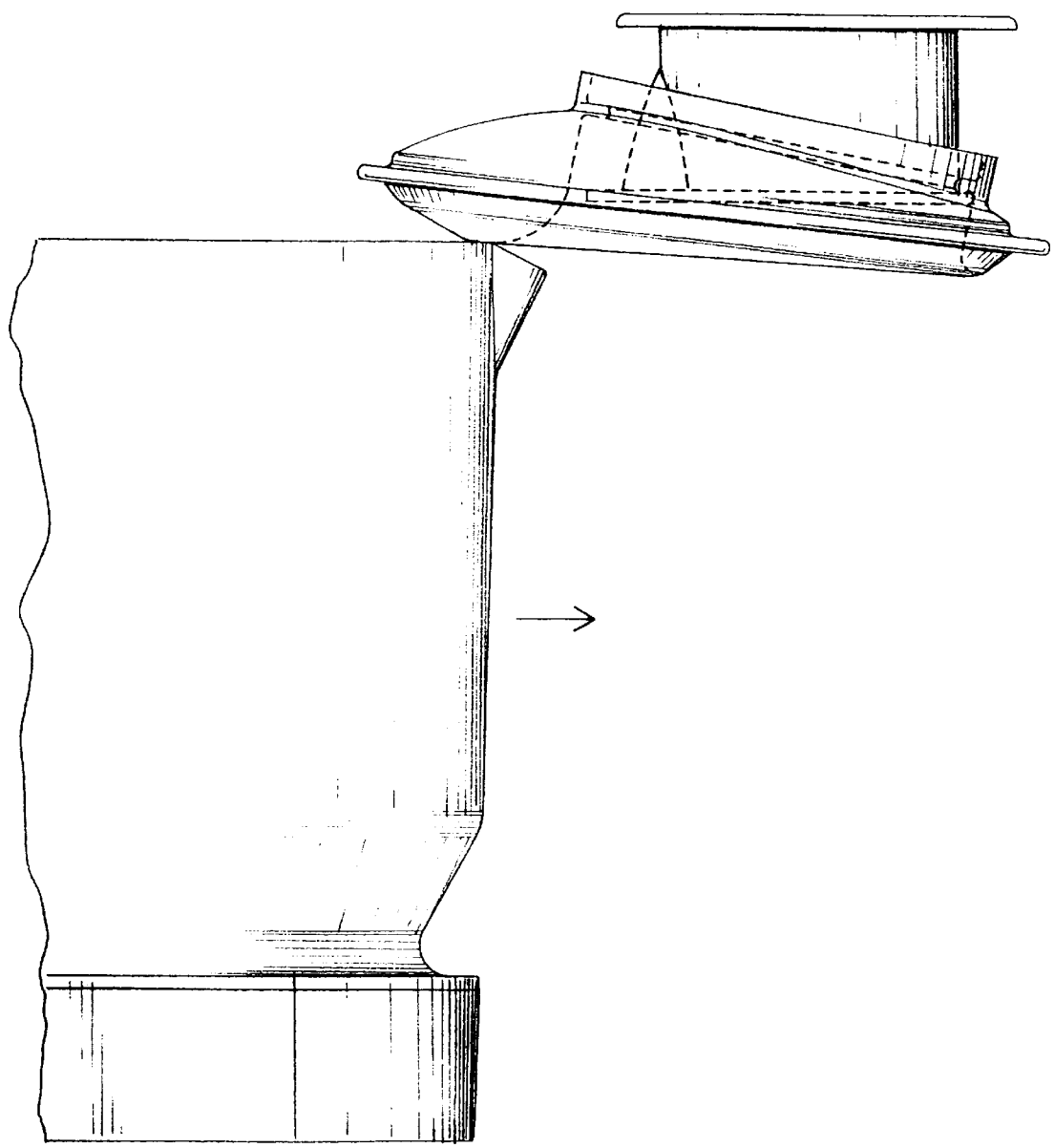
FIG. 12 is a side view of the cover pushed up from its position in FIG. 10, having been moved upward on the chute by the rim of the blender cup as the cup is moved into position in the ice shaver/blender machine of FIG. 1.
Figure 13:
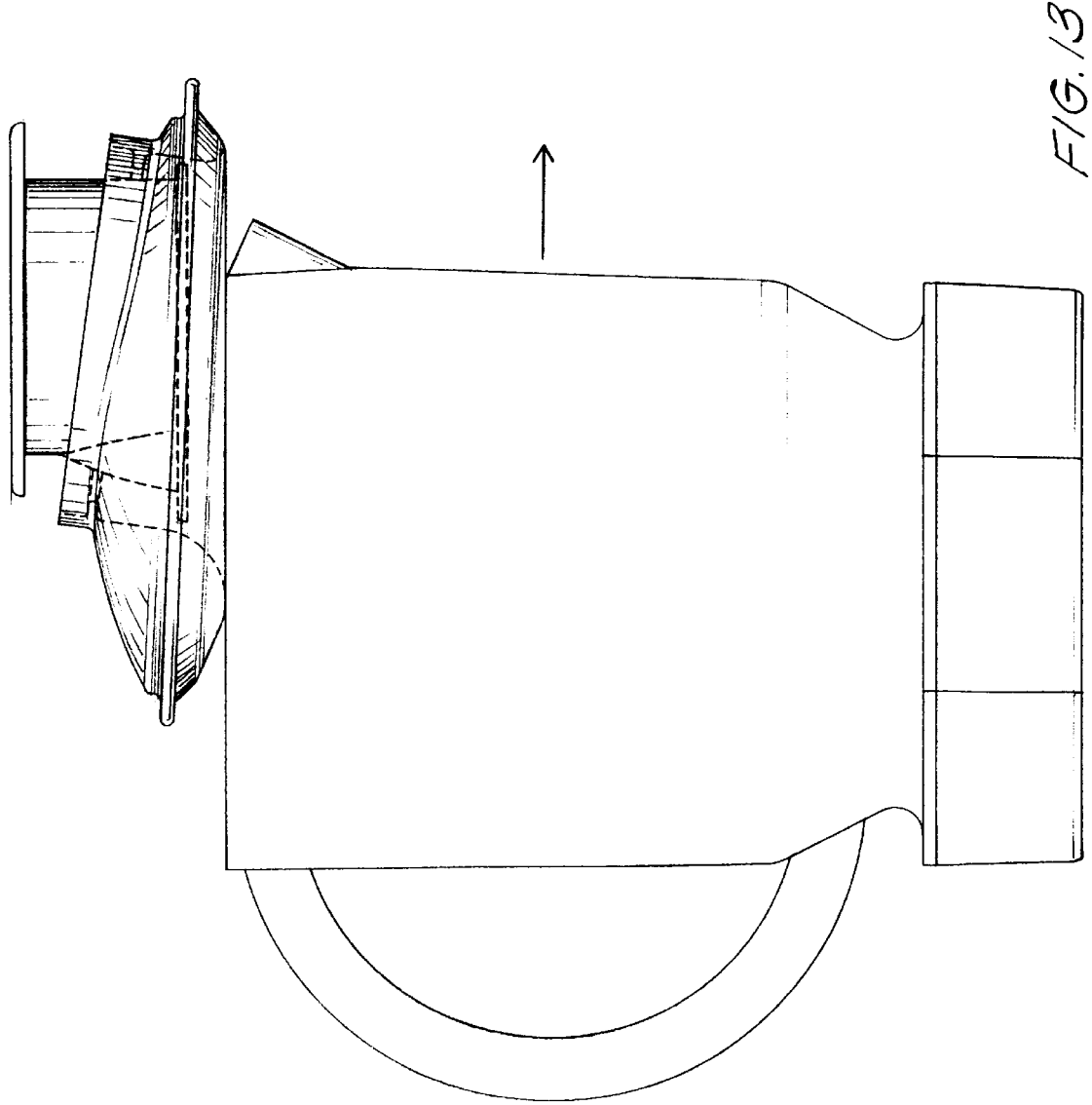
FIG. 13 is a side view of the position of the cover when the blender cup has been pushed in about half-way toward its final position in the machine.
Figure 14:
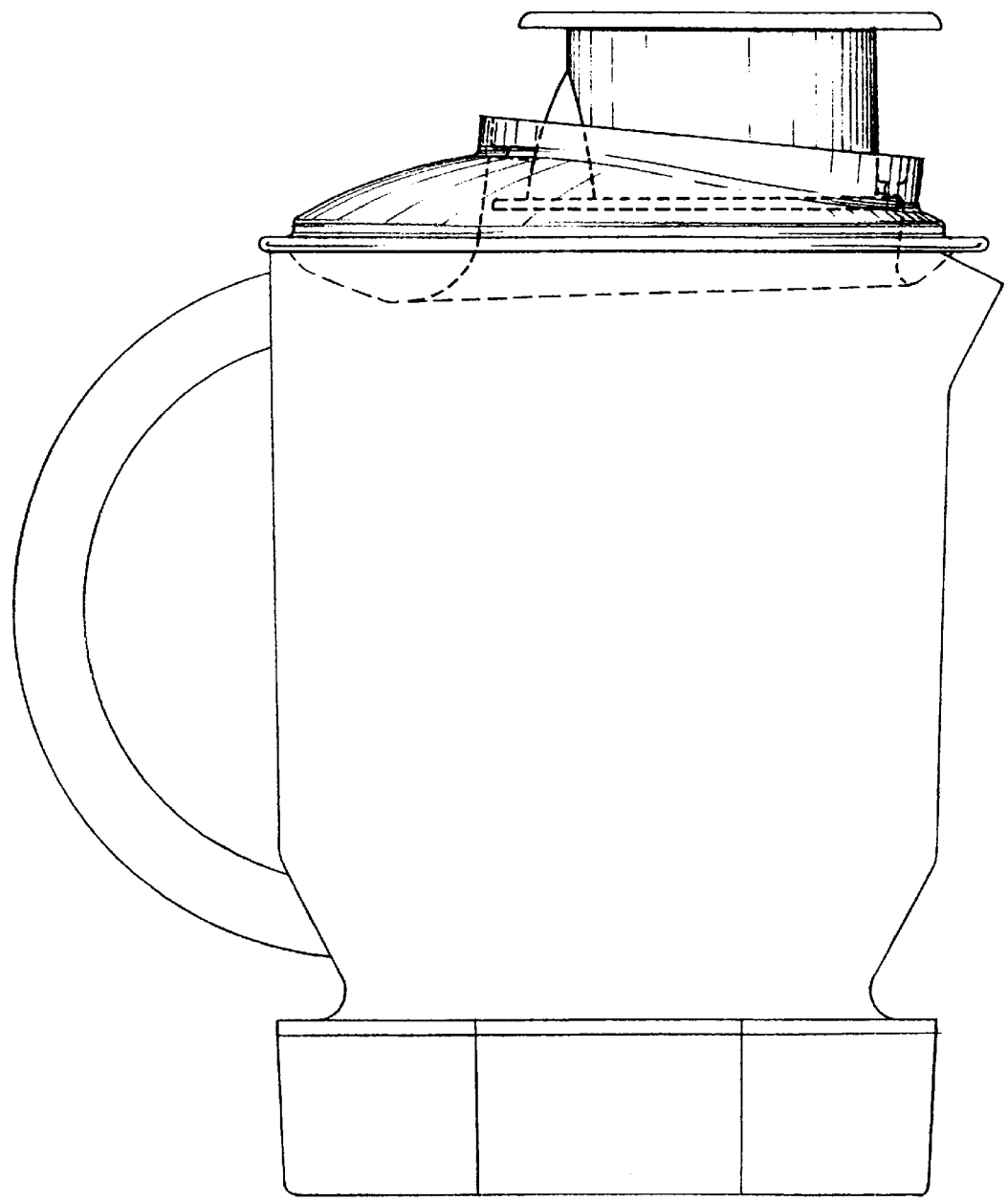
FIG. 14 is a side view of the cover in seated position on and extending into the blender cup, having dropped down from the position of FIG. 13 as the blender cup reaches its final position in the machine.

When the cover 30 is in rest position, its front edge will hang down at such a position that blender cup 25 cannot be slid into the machine without the front rim of the blender cup coming into contact with the front edge of cover 30. (See FIG. 2) As the blender cup 25 is brought into position in machine 10 by sliding it rearward on blender platform 35, the front rim of blender cup 25 will contact the front of rounded lower portion 50 of cover 30, as illustrated in FIG. 12, causing the front of cover 30 to slide upward on ice chute 24 in a camming action. As blender cup 25 continues to its final position, the lower portion 50 of cover 30 will continue to slide along the rim of blender cup 25 (FIG. 13), causing the entire cover 30 to be pushed upward, until the cup reaches approximately its final position (FIG. 14), at which point cover 30 will drop down into seated position, circumferential rim 49 of cover 30 resting on the upper rim of the blender cup 25, and the lower portion 50 extending into the cup. The weight and shape of cover 30 and its semi-rigidness ensure that cover 30 will not be dislodged either when shaved ice is being provided to the blender cup through ice chute 24, or when the blender is activated to blend the ingredients in the cup.

In the preferred embodiment here shown, cover 30 is molded from EPDM rubber having a durometer of 60 SDH. It has been found that rubber of this durometer provides the desired rigidity for the cover, but also permits the ribs 42 to be appropriately flexible to permit ready mounting and dismounting of the cover on chute 24, yet sufficiently inflexible to retain the cover on the chute until removal is desired. The supplier of the material, Rubbercraft Corporation of Gardena, Calif., identifies this material as its compound No. 8472M-11.

Cover 30 is about 6 inches in diameter and about 1⅝ inches in height at its tallest point. Circumferential rim 49 is about ⅛ inch thick. Cover aperture 40, at its circular portion at the top of cover 30, is about 3¼ inches in diameter; the distance from angled corner 45 to the back of the aperture is about 3¾ inches. Flexible ribs 42 are about 3/32 inch thick at their outer edge, and project outwardly about 3/16 inch from the inner wall 41 of cover aperture 40. The gaps 43 that separate the flexible ribs 42 are each about 1/16 inch across. Thus in the plane of flexible ribs 42, the cover portion of the cover aperture is about 2 and ⅞ inches in diameter (3¼ inches minus (3/16 plus 3/16 inches)), and about 3 and ⅜ inches from angled corner to back.

The outer diameter of ice chute 24 at its circular portion is about 2¾ inches, and the exterior distance from nose-like projection 47 to the back of ice chute 24 is about 3 and ⅛ inches. Rigid lip 44 extends about 3/16 inches from the body of ice chute 24 and is about ⅛ inch high. The outer diameter of ice chute 24 at lip 44 is about 3 and 1/18 inches at its circular portion. The clearance between this outer diameter and the walls of aperture 40 is about 3/16 inch; the clearance between unflexed ribs 42 and the outer diameter of the chute above lip 44 is about ⅛ inch.

Blender cup 25 has an outer diameter of 5¾ inches, and an internal cup diameter of 5½ inches, at its upper edge. Including base 28, the blender cup is 8 inches tall. The base 28 of the blender cup is about 1½ inches high and 5½ inches in diameter at its rounded portion. The distance between flat areas 28a is 5 inches, and each flat area is about 2¼ inches long.

The distance between straight sections 36b of blender platform 35 is about 5 and ⅛ inches. Thus the only way blender cup 25 can be positioned in the machine is with flat areas 28a of the blender cup in parallel with straight sections 36b. The straight sections 36b are about 3 inches long. The distance from the front of platform 35 to the rear of shoulder 36 is about 7 inches.

It will be readily appreciated by those skilled in the art that the present invention in its broader aspects is not limited to the specific embodiments herein shown and described. Accordingly, variations may be made from the embodiments described herein which are within the scope of the accompanying claims, without departing from the principles of the invention and without sacrificing its chief advantages.

I claim:

1. In a food processing apparatus including a base unit and a removable receptacle for receiving and/or processing food, the improvement comprising a cover assembly for covering said receptacle while the receptacle is in position in the base unit, said cover assembly comprising support means attached to the base unit, and a semi-rigid cover movably attached to the support means, said cover being shaped and sized so that, as the receptacle is moved into position in the base unit, the receptacle contacts the cover and the cover seats itself on the upper edge of the receptacle with a substantial portion of the cover extending into the receptacle, to prevent unwanted splashing or discharge of the food as it is delivered to and/or processed in said receptacle.

2. The apparatus of claim 1, wherein said cover includes flexible attachment means for removably attaching the cover to the support means, and said support means includes retention means cooperating with said attachment means to retain the cover on the support means until removal is desired.

3. The apparatus of claim 2, wherein said support means comprises a chute for delivery of food to the receptacle, and said cover has an aperture through which the food is delivered to the receptacle via the chute.

4. The apparatus of claim 3, wherein said flexible attachment means on said cover comprises a flexible rib projecting into the aperture, and said retention means comprises a lip on the chute to permit the cover to be removably attached to the chute by flexing the rib so that the lip may be passed through the aperture past the rib, and then may engage the rib when the rib returns to its unflexed position.

5. The apparatus of claim 4, wherein the cover comprises an upper portion, a lower portion, and a circumferential rim therebetween, said rim resting on the upper edge of the receptacle when in position in the base unit, and said lower portion of the cover extending into the receptacle.

6. The apparatus of claim 5, wherein the flexible rib and the lip on the chute lie in parallel planes that are generally horizontal when the cover is attached to the chute, and the plane of the rim intersects those planes at an angle such that the plane of the rim points downward in the direction of removal of the receptacle.

7. The apparatus of claim 6, wherein the cover is in the shape of a fat disk, the aperture being positioned off-center toward the rear of the disk when the cover is mounted on the support means, so that the cover is more heavily weighted in the area toward the direction of removal of the receptacle.

8. The apparatus of claim 7 wherein the lower portion of the disk that first contacts the receptacle as the receptacle is introduced into the base unit, has a curved surface extending downwardly from the rim of the cover, the surface being shaped to cause that portion of the cover to be immediately forced upward upon contact with the receptacle.

9. The apparatus of claim 8 wherein the cover and the chute include orientation means that cooperate to ensure that the cover is in proper orientation when attached to the chute.

10. The apparatus of claim 9, wherein the aperture in the cover is generally circular, but includes an angled portion for receipt of a like-angled projection extending from the generally cylindrical chute in the area of the lip, the angled portion of the aperture cooperating with the angled projection to base unit the cover in proper orientation by preventing rotation of the cover on the chute.

11. The apparatus of claim 10, wherein the angled portion of the aperture and the angled projection point toward the front of the machine when the cover is attached to the chute.

\* \* \* \* \*